United States Patent
Richardson et al.

(10) Patent No.: US 10,161,543 B2
(45) Date of Patent: Dec. 25, 2018

(54) MULTI-PART INSERT

(71) Applicant: Zephyros, Inc., Romeo, MI (US)

(72) Inventors: Henry Richardson, Washington, MI (US); Dennis Skonieczny, Shelby Township, MI (US); Liven Li, Troy, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 13/688,672

(22) Filed: Nov. 29, 2012

(65) Prior Publication Data
US 2013/0133771 A1    May 30, 2013

Related U.S. Application Data

(60) Provisional application No. 61/564,490, filed on Nov. 29, 2011.

(51) Int. Cl.
*F16L 9/00* (2006.01)
*B62D 25/04* (2006.01)
(Continued)

(52) U.S. Cl.
CPC .............. *F16L 9/00* (2013.01); *B62D 25/04* (2013.01); *B62D 29/002* (2013.01)

(58) Field of Classification Search
CPC ........ B62D 25/00; B62D 25/02; B62D 21/15; B62D 25/04; B62D 29/00; F16L 9/00; F16L 9/006; F17L 9/22
(Continued)

(56) References Cited

U.S. PATENT DOCUMENTS 5,575,526 A   11/1996   Wycech
5,755,486 A   5/1998    Wycech
(Continued)

FOREIGN PATENT DOCUMENTS

EP   1391368        2/2004
EP   2154052 A1    2/2010
(Continued)

OTHER PUBLICATIONS

Evidentiary reference "What is heat staking?" retrieved Mar. 11, 2015.*
(Continued)

*Primary Examiner* — Joanna Pleszczynska
(74) *Attorney, Agent, or Firm* — The Dobrusin Law Firm, P.C.

(57) ABSTRACT

An insert comprising: a first carrier portion, the first carrier portion including: at least one attachment portion; a non attachment portion; and a portion of a channel, the channel being surrounded by the attachment portion and the non-attachment portion, and extending along all or a portion of the longitudinal axis of the first carrier portion; a second carrier portion, the second carrier portion including: at least one attachment portion; a non-attachment portion; and a portion of a channel, the channel being surrounding by the attachment portion and the non-attachment portion, and extending along all or a portion of the longitudinal axis of the second carrier portion; wherein the first carrier and the second carrier are attached via the respective at least one attachment portions forming a channel between the first carrier portion and the second carrier portion so that components, devices, fluids, or a combination thereof may pass through all or a portion of the insert.

19 Claims, 3 Drawing Sheets

(51) Int. Cl.
B62D 29/00 (2006.01)
F16L 9/22 (2006.01)

(58) Field of Classification Search
USPC .............. 428/34.1, 188; 296/187.01, 193.01, 296/193.06, 187.03, 193.03, 187.02; 52/843, 847
See application file for complete search history.

(56) References Cited

U.S. PATENT DOCUMENTS

| | | | |
|---|---|---|---|
| 5,766,719 A | 6/1998 | Rimkus | |
| 5,932,680 A | 8/1999 | Heider | |
| 6,131,897 A | 10/2000 | Barz et al. | |
| 6,311,452 B1 | 11/2001 | Barz et al. | |
| 6,354,623 B1* | 3/2002 | Delmastro | B60R 21/2165 180/90 |
| 6,854,790 B2* | 2/2005 | Yoshida | 296/187.05 |
| 6,935,681 B2 | 8/2005 | Hasler et al. | |
| 7,318,873 B2 | 1/2008 | Czaplicki et al. | |
| 7,390,251 B2* | 6/2008 | Hadlock, Jr. | F24F 13/02 454/289 |
| 7,621,373 B2 | 11/2009 | Helferty | |
| 7,673,930 B2 | 3/2010 | Stratman | |
| 7,735,906 B2 | 6/2010 | Takahashi et al. | |
| 8,020,924 B2 | 9/2011 | Niezur et al. | |
| 8,361,589 B2 | 1/2013 | Kraushaar | |
| 8,388,037 B2 | 3/2013 | LaNore et al. | |
| 2003/0159261 A1* | 8/2003 | Kappenstein | B29C 45/14311 29/17.1 |
| 2004/0166354 A1* | 8/2004 | Schulze | 428/542.8 |
| 2005/0082872 A1 | 4/2005 | Rich | |
| 2005/0127145 A1 | 6/2005 | Czaplicki et al. | |
| 2006/0130997 A1* | 6/2006 | Marshall | A47L 23/205 165/41 |
| 2007/0212999 A1 | 9/2007 | Godett | |
| 2008/0029200 A1 | 2/2008 | Sheasley | |
| 2009/0085379 A1 | 4/2009 | Takahashi | |
| 2009/0309387 A1* | 12/2009 | Goral et al. | 296/187.03 |
| 2010/0092733 A1 | 4/2010 | Blank et al. | |
| 2011/0189428 A1 | 8/2011 | Belpaire et al. | |
| 2011/0206890 A1 | 8/2011 | Belpaire et al. | |
| 2011/0236610 A1 | 9/2011 | Belpaire | |
| 2011/0236616 A1 | 9/2011 | Belpaire | |
| 2012/0141724 A1 | 6/2012 | Belpaire et al. | |
| 2013/0181470 A1 | 7/2013 | LaNore et al. | |

FOREIGN PATENT DOCUMENTS

| | | |
|---|---|---|
| EP | 2159109 A1 | 3/2010 |
| EP | 2159136 A1 | 3/2010 |
| EP | 2401191 B1 | 10/2013 |
| WO | 01/68394 | 9/2001 |
| WO | 03/020574 | 3/2003 |
| WO | 2009/080814 A1 | 7/2009 |
| WO | 2010/018190 A1 | 2/2010 |

OTHER PUBLICATIONS

International Search Report & Written Opinion dated Feb. 14, 2013 for PCT/US2012/066979.
PCT International Preliminary Report on Patentability dated Nov. 11, 2013; Appln. No. PCT/US2012/066979.
Chinese Office Action dated Sep. 25, 2015; Application No. 201280068087.5.

* cited by examiner

MULTI-PART INSERT

FIELD OF THE INVENTION

The present invention generally relates to multiple carriers that form a channel between two or more carriers and form an insert.

BACKGROUND OF THE INVENTION

Typically, inserts include a carrier covered by a reinforcement material. The carrier is one solid piece and the carrier is created without any internal hollow sections along the longitudinal axis of the insert. The inserts are placed in a cavity and adhere to the internal walls of the cavity; thus, reinforcing the cavity. The reinforcement material may expand so that the entire cavity is filled by the carrier and the reinforcing material. The inserts generally do not include any structure to allow for components, devices, fluids, or a combination thereof to pass though the longitudinal axis of the insert.

One disadvantage faced by known inserts is that as the inserts become longer and longer (i.e., longer than 12 cm) it is no longer feasible to hollow out parts of the carrier to accommodate components, devices, fluids, or a combination thereof. In some instances the length of the part is less than 12 cm, but the cross-section of the part is small and due to the small cross-section the carrier cannot be hollowed out.

Another disadvantage faced by known inserts is that once the reinforcement material is cured in the cavity the reinforcement material becomes increasingly difficult to core due to the hardness of the reinforcement material, the geometry of the insert, the geometry of the cavity, or a combination thereof. In some instances a separate tube has been placed alongside of the insert so that the components, devices, fluids, or a combination thereof, may pass through the cavity. However, adding a tube alongside of the insert may be time consuming and/or difficult due to the flexible nature of the tube because the tube flexes and becomes stuck as the tube tries to conform to the geometry of the cavity. Further, the flexible tube may be kinked and/or damaged as the tube is placed in the cavity and does not function to accommodate components, devices, fluids, or a combination thereof. In some instances the insert is modified to include a smooth lead in and/or path so that a tube may be used and placed alongside of the insert; however this is expensive, time consuming, and increases the number of materials needed for reinforcement. In some instances the tube may be damaged during insertion into the cavity or crushed by the reinforcement material so that the tube leaks, cannot house components and/or devices, cannot provide a path through the insert, or a combination thereof. Thus, there is a need for an insert that includes a channel substantially along the longitudinal axis of the insert so that components, devices, fluids, or a combination thereof may be accommodated without having to core out the insert (e.g., the carrier, a reinforcement material, or both), and without adding additional components (e.g., a drain tube) to the cavity to be reinforced.

SUMMARY OF THE INVENTION

One possible embodiment of the present invention includes: an insert comprising: a first carrier portion, the first carrier portion including: at least one attachment portion; a non-attachment portion; and a portion of a channel, the channel being surrounded by the attachment portion and the non-attachment portion, and extending along all or a portion of the longitudinal axis of the first carrier portion; a second carrier portion, the second carrier portion including: at least one attachment portion; a non-attachment portion; and a portion of a channel, the channel being surrounding by the attachment portion and the non-attachment portion, and extending along all or a portion of the longitudinal axis of the second carrier portion; wherein the first carrier and the second carrier are attached via the respective at least one attachment portions forming a channel between the first carrier portion and the second carrier portion so that components, devices, fluids, or a combination thereof may pass through all or a portion of the insert Another possible embodiment of the present invention includes: a shaped pillar reinforcing body comprising: at least two carrier portions that are attached together to provide a body that: provides structural reinforcement by filling a cavity and distributing energy from a load; provides a surface geometry that carries a sufficient amount of reinforcing material that can be expanded and bonded to surrounding surfaces; and provides an obstruction free internal part for routing a component, a device, a fluid, or a combination thereof; an attachment portion on each of the at least two carriers so that shear is resisted along an attachment region between the two portions; and an external reinforcing material that is applied to an outer portion of the at least two carriers that is unconstrained from outward expansion between the two portions and an adjacent surface.

Yet another possible embodiment of the present invent includes: A method of reinforcing comprising: providing a first carrier portion and second carrier portion that include one or more attachment portions and a portion of a channel; attaching the first carrier portion to the second carrier portion via the attachment portions to create an insert, the insert being resistant to shear along the attachment portions, an including a channel spanning a longitudinal axis of the insert; inserting the insert into a cavity; heating the cavity and the insert so that the insert and bonds to the cavity and reinforces the cavity.

One unique aspect of the present invention envisions an insert with multiple carrier portions that when attached and/or combined include an internal channel along the longitudinal axis so that components, devices, fluids, or a combination thereof may pass at least a portion of the way through the insert. The portions of the channel are integrally made in the carrier portions so that when the carriers are combined the insert includes an integral channel, thus, eliminating the need for an additional tube being used with the insert.

Another unique aspect of the present invention envisions increased flexibility with the size (i.e. cross-sectional dimension and/or length) of the channel. The present invention will allow for channels to be included in parts with smaller cross-sectional dimensions and parts with an increased length (i.e. 12 cm or longer). The present invention will eliminate the need for additional tubing placed in the channel so that components, devices, fluids, or a combination thereof can pass through all or a portion of the insert.

Yet another unique aspect of the present invention allows for flexibility as to how the insert is attached to the cavity. The insert may be attached to the cavity using an adhesive, an expandable material, a mechanical fastener, or some other material that attached directly to the walls of the cavity. However, the insert may connect directly to the walls of the cavity without any intervening material between the two. It is contemplated that a material may push the two attachment portions of the two corresponding carriers apart so that the carriers are pushed into contact with the walls of the cavity and held in place.

DETAILED DESCRIPTION OF THE INVENTION

The following description of the preferred embodiment(s) is merely exemplary in nature and is in no way intended to limit the invention, its application, or uses. This application is related to and claims the benefit of the filing date of U.S. Provisional Application Ser. No. 61/564,490, filed on Nov. 29, 2011, the contents of this application being incorporated by reference herein for all purposes.

The present teachings are predicated upon providing an improved insert for providing reinforcement to a cavity. The insert includes a first carrier portion and a second carrier portion jointed together by an expandable reinforcement material. The first carrier portion and the second carrier portion when joined together form a channel therebetween.

Generally, the insert may be used in any device that includes a cavity where reinforcement is desired. The insert may be used with almost any vehicle (e.g. car, truck, bus, train, airplane, or the like). Alternatively, the insert may be integrated into components used for manufacturing or other equipment that include a cavity that requires reinforcement such as furniture, aerospace vehicles, robotic parts, amusement park rides, or the like. However, the present teachings are most suitable for use with a passenger vehicle (i.e. a car, truck, sports utility vehicle, or the like).

The present teachings include an insert. The insert may be any insert that provides reinforcement to a cavity. The insert may be a multi-part insert. Preferably, the insert may be any insert that provides reinforcement to a pillar. More preferably, the insert may be any insert that provides reinforcement to a pillar in a vehicle so that the insert fills the cavity and distributes energy from a load. The insert may have a length. The length of the insert may be any length so that the insert may be used to reinforce a cavity. The insert may be about 5 cm or longer, about 7 cm or longer, about 10 cm or longer, or about 15 cm or longer. The insert may be about 100 cm or shorter, about 50 cm or shorter, about 30 cm or shorter, about 20 cm or shorter (i.e. about 15 cm). The insert may have a length of between about 10 cm and about 60 cm and preferably between about 12 cm and about 25 cm. The insert may include a width. The width of the insert may be any width so that the insert may be use width of to reinforce a cavity. The width of the insert may be about 3 cm or more, about 4 cm or more, about 5 cm or more, or about 6 cm or more. The width of the insert may be about 14 cm or less, about 1.2 cm or less, about 10 cm or less, or about 8 cm or less (i.e. about 6.7 cm). The insert may have a width of between about 5 cm to about 8 cm. The insert may include a height (i.e., a depth). The height may be any height so that the insert may be used to reinforce a cavity. The height may be about 0.5 cm or more, about 1 cm or more, or about 2 cm or more. The height may be about 10 cm or less, about 6 cm or less, or about 3 cm or less (i.e. about 2.5 cm). The height of the insert may be between about 2 cm and 4 cm. The insert may be made of one piece (i.e. one carrier). Preferably, the insert may be made of multiple pieces (i.e. at least two carriers). For example, the insert may be made of two pieces, three pieces, four pieces, or more. The insert may be made of separately manufactured carriers that are assembled together. More preferably, the insert may be made of two carriers joined together by a reinforcement material (e.g., an adhesive or an expandable material) or a fastening device (e.g., a hinge, a mechanical interlock, a pin, a integral lock, a male feature, a female feature, a flat surface, a recess, or a combination thereof).

The carriers may have a clam shell design so that when they are attached and/or combined they form an insert. The carriers may be held together by any device that holds two opposing pieces, devices, components, or a combination thereof together. The carriers may be held together by a reinforcing material. The carriers may be held together by a reinforcing material and may be free of a reinforcing device. The carriers may be held together by both a reinforcing material and a reinforcing device on the same attachment portion. The carrier may include any reinforcing device that may hold carriers together. The carriers may be held together by a fastening device only. The carriers may be held together by a fastening device and free of a reinforcing material. The carriers may be held together by a combination of the fastening devices and the reinforcement material disclosed herein.

One or more carriers may have opposing hinges so that when they are attached they form one piece (i.e. an insert). One or more carrier may include a hinge on one side. One or more carriers may include a hinge on both sides. One or more carrier may include a mechanical interlock so that when combined with another carrier the carriers are fixedly attached to each other. The mechanical interlock may be a tongue and groove structure. The mechanical interlock may be a mechanical interlock consistent with the teachings herein and U.S. Pat. No. 6,311,452; Column 3, lines 9-34 and FIGS. 1-3, incorporated by reference herein. One or more carriers may include a pin. The pin may pass through a portion or one or more carriers. Preferably, the pin may pass through portions of two carriers so that the carriers are fixedly attached to each other. One or more of the carriers may rotate about the pin when a pin is in one side of a carrier. The pin may be located in the center of one or more carriers. The pin may be located on the edge of one or more carriers. The pin may be any pin consistent with the teachings herein and U.S. Pat. No. 6,311,452; Column 3, lines 35-43 and FIGS. 3 and 5, incorporated by reference herein. One or more carriers may include an integral lock. One or more carriers may include a dowel. One or more carriers may include an attachment feature so that the dowel may be attached to the opposing carrier. One carrier may include a dowel and one opposing carrier may include a receptor so that the dowel may be attached to the opposing carrier. The attachment portion may include a male feature, a female feature, or both so that two or more carriers may be attached together without the use of a reinforcement material, an adhesive, an expandable material, or a combination thereof disclosed herein. The attachment portions of two opposing carriers may be attached together via a dowel and attachment portion, a fastener, a male and female attachment feature, a pin, an adhesive, an expandable material, a reinforcement material, or a combination thereof. The carriers may include one or more of the attachment devices discussed herein. For example, the carrier may have a hinge on one side and a mechanical interlock on the opposite side. The carrier includes an attachment portion that may include an attachment device. Attachment may be made using a hinge, a mechanical interlock, a pin, an integral lock, a male feature, a female feature, a flat surface, a recess, an adhesive, an expandable material, a reinforcement material, or a combination thereof.

The carriers may be any shape so that the carriers may be attached and located within of a cavity. The carriers may be mirror images of each other. The carriers may be reverse mirror images of each other. The carriers may be generally planar. The carriers may include a contour. The carriers may be generally arcuate. The carriers may have a substantially continuous surface. One carrier may include an arc and one carrier may be generally square. One carrier may include a bulbous portion and one carrier may be free of a bulbous portion. The carrier may have one or more generally planar surfaces connected by an angle. For example, each carrier may include three substantially planar walls that are 60 degrees from each other, or four walls that are 45 degree angles from each other. The at least two carriers may be manufactured separately and then attached to each other during vehicle assembly. The at least two carriers may be attached to each other via an attachment portion.

The carriers may include an attachment portion and a non-attachment portion. Preferably, each carrier includes at least one attachment portion. More preferably, each carrier includes an attachment portion on each side of the carrier (i.e. two attachment portions). The attachment portion may include a reinforcement material. The attachment portion may attach to a portion of a cavity in which the insert is located (e.g. a wall). Preferably, the attachment portion may attach to another carrier's attachment portion via a reinforcement material so that the carriers are fixedly attached to each other. More preferably, the carriers each include an attachment portion so that shear that is resisted along an attachment region between the two corresponding attachment portions. The attachment portion may attach to another carrier's attachment portion via one or more of the mechanical devices disclosed herein so that the carriers are fixedly attached to each other. The attachment portion may attach to another carrier's attachment portion via a reinforcement material disclosed herein and a mechanical fastening device disclosed herein so that the carriers are fixedly attached to each other. The carrier may provide a surface geometry that carries a sufficient amount of reinforcing material that can be expanded, bonded, or both to surrounding surfaces. The geometry of the carrier may be such that an external reinforcing material may be applied to all or a portion of an outer portion of the at least two carriers. The external reinforcing material may be unconstrained from outward expansion between the two portions (i.e., the carriers) and an adjacent surface (e.g., a wall of a cavity). The carrier may provide a surface geometry so that the carrier may be held in place only by the geometry of the carrier itself. The non-attachment portion may attach to a portion of the cavity, a portion of another carrier, or both. Preferably, the non-attachment portion is free of contact with the opposing carrier. More preferably, the non-attachment portion may be separated from the opposing carrier via a channel, a void, or both and the non-attachment portion is free of contact with a reinforcement material. The non-attachment portion may attach to a wall of the cavity. The non-attachment portion may directly attach to a cavity. The non-attachment portion may indirectly attach to a cavity (e.g., via a reinforcing material).

The attachment portion may include a reinforcement material, a fastening device, or both. The attachment portion of the carrier may be substantially planar. The attachment portion may include a reinforcement material. The attachment portion of the carrier may include a recess. The recess of the attachment portion may include a reinforcement material. Each carrier may include one recess and when one carrier is aligned with the opposing carrier the recesses of each carrier may be on opposite sides of the channel so that both attachment portion are connected. The reinforcement material may be located within the recess in a green state, a cured state, an expanded state, or a combination thereof. For example, the reinforcement material may not extend outside of the recess in a green state, a cured state, an expanded state, or a combination thereof. Preferably, the reinforcement material may not be located in the channel in a green state, a cured state, an expanded state, or a combination thereof. The recess may prevent the reinforcement material from entering the channel. The reinforcement material may be directed away from the channel via a mechanical interlock as discussed herein. The recess may allow the reinforcement material to expand away from the channel so that the channel is free of reinforcement material.

The insert may have a cross-sectional shape. The cross-sectional shape of a carrier may be any shape so that the insert fits into a cavity. Preferably, the cross-sectional shape of the carrier may be any shape so that the one or more carriers fit into a cavity and include a channel in the cavity. For example, the cross-sectional shape of a carrier may be a half circle, a "C" shape, a "U" shape, a "J" shape, a half toroidially shape, square shaped, rectangular shaped, the like, or a combination thereof. The carriers and/or channel may be asymmetrically shaped and when the two pieces are joined the two pieces form a symmetrical part and/or channel. The carriers and/or channels may be asymmetrical when the two pieces are joined. The channel may be triangular, octagonal, hexagonal, pentagonal, a rhomboid, or some combination thereof. The cross-section of each insert may be one solid piece. The cross-section of each piece may have an area that is free of material. The cross-section of each piece may include a void. For example, the cress-section may be substantially square and one side of the piece may be missing a section so that the side includes two smaller parts that form at least a portion of a void and/or channel therebetween. The channel and/or void may be created when the carrier is created. The channel and/or void may be created after the carrier is created. For example, when the carrier is created a tube may be inserted into the carrier. The carrier may include a tube molded into the carrier. The two or more carriers may be attached and then a tube may be fixed in the insert via an adhesive and/or expandable material. The tube may be a partial tube (i.e., half of a tube). The tube may be a polymer, a plastic, metal, any other material discussed herein or a combination thereof. For example, the void may be drilled into the carrier, the void may be cut into the carrier, a portion of the carrier may be melted away or a combination thereof.

The insert may include a void and/or channel. The void and/or channel may be formed between two or more carriers. The void and/or channel may include one open end and one closed end. The void and/or channel may include two open ends. The void and/or channel may include one open end and a second opening along a wall of the void and/or channel so that a component, device, a fluid, or a combination thereof may pass through the insert. The void and/or channel may be an obstruction free internal part for routing a component, a device, a fluid, or a combination thereof. The void and/or channel of each carrier may be surrounded by the attachment portion, the non attachment portion, reinforcing structures, or a combination thereof. The void and/or channel may extend along all or a portion of the longitudinal axis of the insert, the one or more carriers, or both. The void and/or channel may extend the full length of the insert so that components, devices, fluids or a combination thereof may pass through the channel. The insert may be made of one carrier that includes a void and/or channel and one carrier that may be free of a void and/or a channel so that when the two pieces are put together the part includes a channel that spans the full length of the insert. Preferably, both carriers may include a portion of a channel so that the two channels align to form one channel. The channel may extend a portion of the length of the insert. The channel may include a generally transverse internal wall. Preferably, the channel may be free of a generally transverse internal wall. The channel may extend about 10 percent or more, about 25 percent or more, or about 50 or more of the length of the insert. The channel may extend about 100 percent or less, about 75 percent or less, or about 60 percent or less of the length of the insert. The channel may extent between about 50 percent and about 100 percent of the length of the insert.

The channel may be any size so that a material (e.g., components, devices, fluids. Or a combination thereof) may pass through the insert via the channel. The channel may be of a size so that one or more components, devices, fluids, or a combination thereof may simultaneously pass through and/or fit in the channel. The channel may hold one or more devices, components, fluids, or a combination thereof. The component may be a wire, a cord, a tube, or a combination thereof. The fluid may be any fluid that may pass through the channel. The fluid may be air, water, or both. The device may be a transmitter, an adhesive, an antenna, or a combination thereof. The channel may include a dimension. The dimension may be any dimension so that at least one device, component, fluid, or a combination thereof may fit into and/or pass though the insert via the channel. The dimension of the channel may be a diameter, a length, a width, or a combination thereof. The largest size of the dimension may be about 0.5 cm or more, about 1 cm or more, about 3 cm or more, or about 4 cm or more. The largest size of the dimension may be about 20 cm or less, about 15 cm or less, or about 10 cm or less. The channel may include a path. The path of the channel may be generally straight. The path of the channel may be generally arcuate. The path of the channel may include straight section and arcuate sections. The path may include a tortuous portion. The tortuous path may be consistent with the teaches herein and U.S. Pat. No. 7,621,373; Column 1, lines 28-51; Column 3, line 65 to Column 4, line 22; Column 4, line 55 to Column 5, line 6 and the claims, incorporated by reference herein.

The carriers may include one or more reinforcing structures. The carriers may include any structure that structurally strengthens the carriers. One carrier may include reinforcing structures and one carrier may be free of reinforcing structures. The carrier with reinforcing structures may be attached to a carrier that is free of reinforcing structures. The reinforcing structures may be vertical (i.e. parallel) relative to the longitudinal axis of the channel. The reinforcing structures may be horizontal (i.e. perpendicular) relative to the longitudinal axis of the channel. The reinforcing structures may be diagonal (e.g. at an angle of between about 30 degrees and about 60 degrees) relative to the longitudinal axis of the channel. Preferably, the insert includes reinforcing structures formed as ribs that are arranged generally transverse in relationship to the longitudinal axis of the channel formed by the carriers. The ribs may have a curved edge. Preferably, reinforcing structures may be generally transverse and provide load handling characteristics. The reinforcing structures may be any structure that may handle a load. The reinforcing structure may extend beyond the profile of the carrier. Preferably, the reinforcing structure does not extend beyond the profile of the carrier. For example, the reinforcing structures are dimensionally the same size or smaller than the corresponding structure of the carrier in which they are located (e.g. the reinforcing structure may not extend beyond the edge of a non-attachment portion). The reinforcing structures may be laterally spaced apart along a longitudinal axis of the carrier. The reinforcing structures may be spaced apart at a distance so that the reinforcement structures reinforce a cavity. The reinforcing structures may be spaced about 0.5 cm apart or more, about 1 cm apart or more, about 15 cm apart or more, or about 2.0 cm apart or more. The reinforcing structures may be spaced about 5 cm apart or less, about 4 cm apart or less, or about 3 cm apart or less (i.e., about 2.5 cm apart). The reinforcing structures may be spaced between about 1 cm and 4 cm apart. For example, the reinforcing structures may be positioned along the length of the channel so that multiple reinforcing structures are located along the length of the channel. The reinforcing structures may bridge opposing structures that include a reinforcement material. For example, the reinforcing structure may span between an attachment portion and a non-attached portion of a carrier. Reinforcing structures may be located on the ends of the carriers. The reinforcing structures may be located on one end of a carrier. Reinforcing structures may be located on both ends of the carriers. A recess may be defined between each reinforcing structure. The reinforcing structures may provide for a clearance between an external surface of the respective carrier portion and any inwardly extending projections from a wall of the cavity. The reinforcing structures, the recess, or both may include an expandable material (e.g., a foam or foamable material). Preferably, the reinforcing structures, the recess, or both may be free of a reinforcing material. The recess between the reinforcing structures may be free of a reinforcing material.

The insert may include a funnel. The insert may include a funnel at both ends. Preferably, the insert only includes a funnel at one end. The funnel may lead to the channel. The funnel may lead to a tortuous path in the channel. The funnel may be any shape so that components, devices, fluids, or a combination thereof may be guided into the channel. The funnel may have openings that are one constant dimension (e.g., diameter, internal cross-sectional area, or both). The funnel may have an opening with one dimension on one side and a different dimension on the opposite side. The funnel may have openings with a small dimension leading into the channel and a large dimension on the side opposite the channel, the small dimension, or both. The opening's cross-sectional dimension may gradually become smaller along a length of the funnel as the funnel approaches the channel. The size of the openings may have a ratio. The ratio of the opening near the channel to the opening opposing the channel may be about 1:2 or greater, about 1:5 or greater, about 1:10 or greater, or even about 1:20 or greater. The ratio of the opening near the channel to the opening opposing the channel may be about 10:1 or less, about 5:1 or less, about 2:1 or less, or preferably about 1:1 or less. The ratio of the opening near the channel to the opening opposing the channel may be between about 2:1 and about 1:10 and preferably between about 1:1 and about 1:5.

The funnel may be a separate piece added to the insert. The funnel may be added after the two or more carriers are combined. The funnel may be added simultaneously as the two carriers are combined. The funnel may be an integral pert of one or more of the carriers. The amount of the funnel that is part of each carrier may be proportionally integral to the number of carriers used (e.g., if there are two carriers the funnel will be separated into substantially two equal portions and joined when the two carriers are joined together, if there are three carriers the funnel will be three substantially equal parts, and so on). The funnel may be attached using any of the features, devices, adhesives, expandable material, or a combination thereof discussed herein for attaching the carriers together. The funnel may be attached to the cavity and then the insert added afterwards. The insert may be placed in the cavity and the funnel attached afterwards. The funnel may be an integral part of the cavity. The funnel may be made of the same material as the cavity. The funnel may be made of any material that may be used to guide components, devices, fluids, or a combination thereof into the channel. Preferably the funnel may be made of the same material as the carrier.

A variety of reinforcement materials may be used with the insert and/or carrier of the present teachings. Preferably, the reinforcement material is formed of a heat activated material that is configured to flow, cure (e.g., be thermosettable), foam and/or expand, or a combination thereof upon exposure to heat. The reinforcement material may be generally dry to the touch and substantially non-tacky or may be tacky and, in either situation, may be shaped in any form or desired pattern, placement, or thickness, but is preferably of substantially uniform thickness. Exemplary reinforcement materials include L-5200, L-5206, L-5207 L-5208, L-5209, and L-5220 foams available through L&L Products, Inc. of Romeo, Mich.

Though other heat-activated materials are possible, a preferred heat activated material is an expandable polymer or plastic, and preferably one that is foamable. Particularly preferred materials are an elastomer-based, epoxy-based, acrylate-based, acetate-based foams, or a mixture thereof. For example, and without limitation, the reinforcement material may be an epoxy-based heat foamable material that can include additional polymeric materials such as core/shell polymer, thermoplastic epoxy resin, combinations thereof, or the like. One exemplary material is disclosed in commonly owned co-pending patent application Ser. No. 11/757, 499, filed Jun. 4, 2007, and published as 2008-0029200, titled TOUGHENED ACTIVATABLE MATERIAL FOR SEALING, BAFFLING OR REINFORCING AND METHOD OF FORMING SAME and incorporated herein by reference in its entirety for all purposes.

A number of epoxy-based or otherwise based foams are known in art and may be employed in the present teachings. A typical foam includes a polymeric base material, such as an epoxy resin or ethylene-based polymer which, when compounded with appropriate ingredients (typically a blowing and curing agent), expands and cures in a reliable and predicable manner upon the application of heat stir the occurrence of a particular ambient condition. From a chemical standpoint for a thermally-activated material, the structural foam is usually initially processed as a flowable thermoplastic material before curing. Upon curing, it will cross-link and/or thermoset which makes the material incapable of further flow.

One advantage of the preferred structural foam materials over prior art materials is that the preferred materials can be processed in several ways. The preferred materials can be processed by injection molding (e.g., overmolding), extrusion, compression molding, or with a mini-applicator. This enables the formation and creation of part designs that exceed the capability of most prior art materials.

One example of an expandable material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, thermoplastic materials, and polyurethane materials. See also, U.S. Pat. Nos. 5,766, 719; 5,755,486; 5,575,526; and 5,932,680, (incorporated by reference).

In applications where the reinforcement material is a heat activated, thermally expanding material, an important consideration involved with the selection and formulation of the material comprising the foam is the temperature at which a material reaction or expansion, and possibly curing, will take place. Typically, the foam becomes reactive or activated at higher processing temperatures, such as those encountered in an automobile assembly plant, when the foam is processed along with the automobile components at the elevated temperatures or at higher applied energy levels, during automotive coating processing (e.g., during paint, primer or e-coat baking, or curing steps). While such temperatures encountered in an automobile assembly operation may be in the range of about 148.89° C. to 204.44° C. (about 300° F. to 400° F.), body and paint shop applications are commonly about 93.33° C. (about 200° F.) or higher. If needed, blowing agent activators can be incorporated into the composition to cause expansion at different temperatures outside the above ranges. Generally, suitable expandable foams have a volumetric range of expansion ranging from approximately about 0 to over about 1000 percent (e.g., the reinforcement material expands to a volume that is between about 101% and about 300% or about 500% of the original unexpended volume of the material).

In the embodiment illustrated, the earner member including the walls and the ribs are all integrally molded (e.g., injection, molded) or formed of single material that is different from the reinforcement material. Suitable materials can include for example, and without limitation, metal (e.g., iron, steel, stainless steel, titanium, aluminum, the like, or a combination thereof) or a polymeric material (e.g., nylon, polyamide, polyester, polypropylene, polyethylene, molding compound, or others) which may be filled or unfilled (e.g., filled with glass or kevlar reinforcement fibers).

It is generally contemplated that an insert of the present application can be employed to reinforce various different articles of manufacture. However, it is has been found quite suitable for reinforcement of structures of automotive vehicles such as pillars, frame members, rails (roof or lower rails), rockers, combinations thereof, or the like.

For formation of a reinforced structure or reinforced system, the insert of the present teachings is typically located within a cavity of a structure of an automotive vehicle and the reinforcement material is then activated to adhere to the walls of the structure defining the cavity and further adhere to the carrier member of the reinforcement. The shape of the reinforcement member typically substantially corresponds to the shape of the cavity into which it is inserted. Upon location within the cavity, it is preferable for relatively small clearances (i.e., clearances between about 1 mm and about 5 cm) to exist between the inner walls or surface of the structure (e.g., cavity) and the extremities of the reinforcement material, the insert, or both. This keeps the reinforcement material close to the surfaces or walls of the structure while still allowing, for example, e-coat to flow through the clearances. In one embodiment, these clearances are maintained, and, at the same time, at least a out 70%, more typically at least about 85% and even possibly at least about 90% of the reinforcement material is within about 15 cm or less, more typically about 10 cm or less, and even more typically about 5 cm or less of the walls and/or surfaces defining the cavity of the structure into which the reinforcement member has been located.

The inset (i.e. reinforcement member) may be held in place in the structure according to various techniques prior to activation of the reinforcement material. For example, fasteners, friction fits, or other structures may be employed to assist in maintaining the insert in place prior to activation of the reinforcement material. Alternatively, the insert may be shaped or located within a structure such that it is naturally held in place by an interference fit, by a lower support of the structure or the like.

The insert may be located in a cavity. The cavity may be a pillar structure of en automotive vehicle. The particular pillar structure may be a B-pillar (e.g., a pillar adjacent and/or nearest the front seat back of a driver or passenger seat of a vehicle), but could be an A-pillar, a C-pillar or, a D-pillar or any of the other structures discussed herein or otherwise, unless otherwise specified. Examples, of some structures that may be reinforced by the present teachings are disclosed in commonly owned U.S. Pat. No. 7,318,873 and U.S. Patent Application Publication No. 2005/0127145, incorporated by reference herein in their entirety for all purposes. Another example of a reinforcement structure is disclosed in commonly owned co-pending patent application Ser. No. 11/863,929, filed Sep. 26, 2007, and now U.S. Pat. No. 7,735,906, titled REINFORCEMENT SYSTEM OF AN AUTOMOTIVE VEHICLE and incorporated herein by reference in its entirety for all purposes. The cavity may be free of a tube. The cavity may only include an insert and its corresponding components.

In one embodiment, the insert extends along substantially the entirety (e.g., at least about 70 percent, 80 percent, 90 percent, or more) of a length of the pillar structure. Thus, it extends substantially from the top of the pillar to the bottom of the pillar. While this is particularly desirable in certain circumstances, it is also contemplated that the insert may extend only a portion of the length or other dimension of a given structure. The insert may extend about 10 percent or more, about 20 percent or more, about 30 percent or more, or about 40 percent or more. The insert may extend about 100 percent or less, about 90 percent or less, about 80 percent or less, or even about 70 percent or less of the length of a cavity (e.g., a pillar structure or a panel structure).

The present teachings contemplate a process for reinforcing a structure, a cavity, a device, or a combination thereof. A method of reinforcing may include one or more of the steps, devices, carriers, inserts, reinforcing materials or a combination thereof. The method may include providing at least two carriers. The at least two carriers may be placed so that their attachment portion correspond. A reinforcing material may be attached to one or more of the attachment portions. The corresponding attachment portions may be connected using a reinforcing materiel, a reinforcing device, or both. The at least two carriers may be attached together creating an insert. The at least two carriers may be attached together creating a channel, a void, or both between the at least two carriers. A cap may be placed on one end or both ends of the insert so that the size of the channel and/or void is changed to a specific shape, size, or both. A reinforcing material may be placed on the outside of the insert. A reinforcing material may be placed on the non-attachment portions. A reinforcing material may be placed on the attachment portions. The insert may be placed in a cavity, a structure, a device, or a combination thereof. The insert, structure, cavity, device, or a combination thereof may be heated so that the reinforcing material becomes tacky and adheres the at least two camera together, adheres the insert to a wall of the part in which it was placed, or both. The insert, structure, cavity, device, or a combination thereof may be may be heated so that the reinforcing material expands and attaches the two attachment portions together, pushes the carrier against a wall of the device in which it was placed, expands so that the material attaches the outside of the carrier to the device in which it was placed, or a combination thereof. The insert may allow a component, a device, a fluid, or a combination thereof to enter the channel and pass at least partially through the insert.

Figure 1:
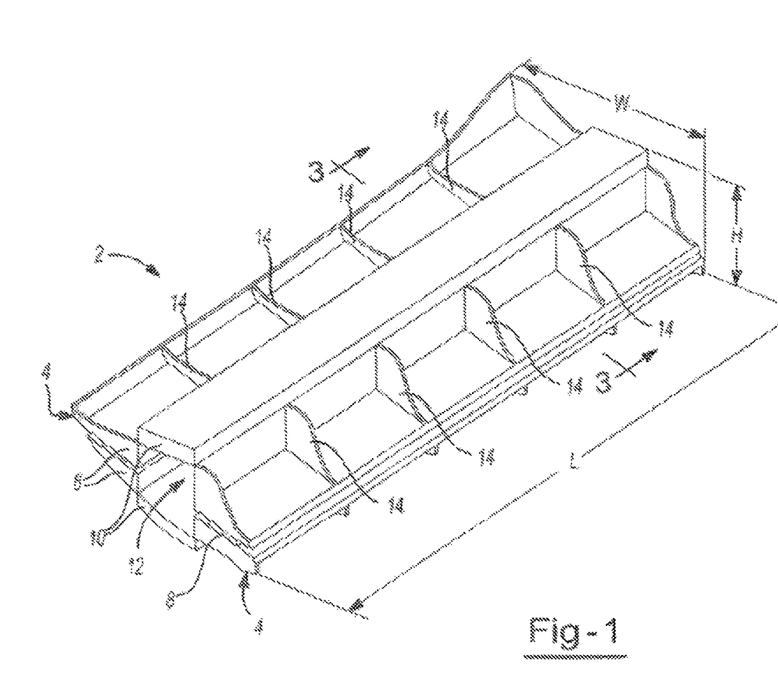
FIG. 1 illustrates one embodiment of the present invention.

FIG. 1 illustrates an insert 2. The insert 2 includes two carriers 4, and the carriers 4 are attached together at attachment portions 6 via a fastening device 8 in a green state. The insert also includes non-attachment portions 10 and a channel 12. The insert includes a length (L), a width (W), and a height (H). The insert includes reinforcing structures 14 that span between the attachment portions 6 and the non-attachment portions 10 so that the strength of the insert is increased.

Figure 2:
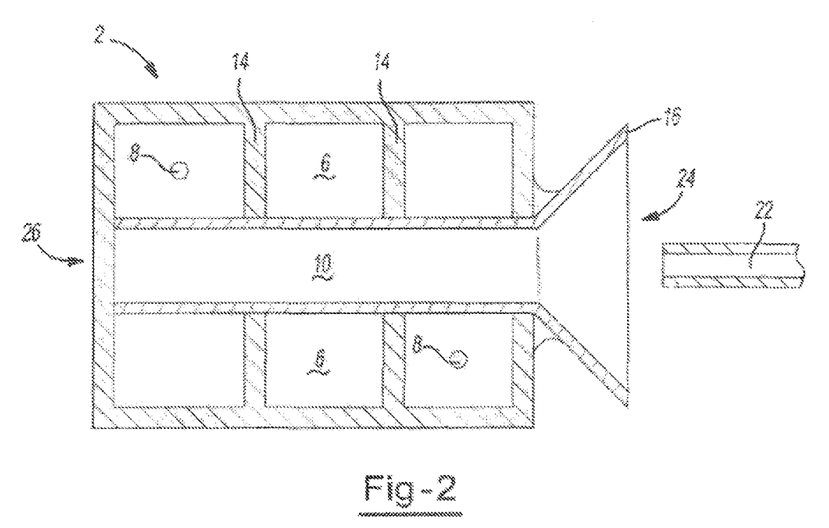
FIG. 2 illustrates a top view of the present invention with a funnel.

FIG. 2 illustrates a top plan view of an insert 2. The insert includes an attachment portion 6 on each side of the non-attachment portion 10. The insert also includes reinforcement structures 14 that connect the attachment portion 6 to the non-attachment portion 10. A funnel 16 is at an open end 24 of the insert 2 opposite a closed end 26 of the insert 2. A portion of the funnel 16 is integrally connected to the Channel (not shown). A component 22 is being guided into the channel (not shown) through the funnel 16 at the open end 24 of the insert 2.

Figure 3:
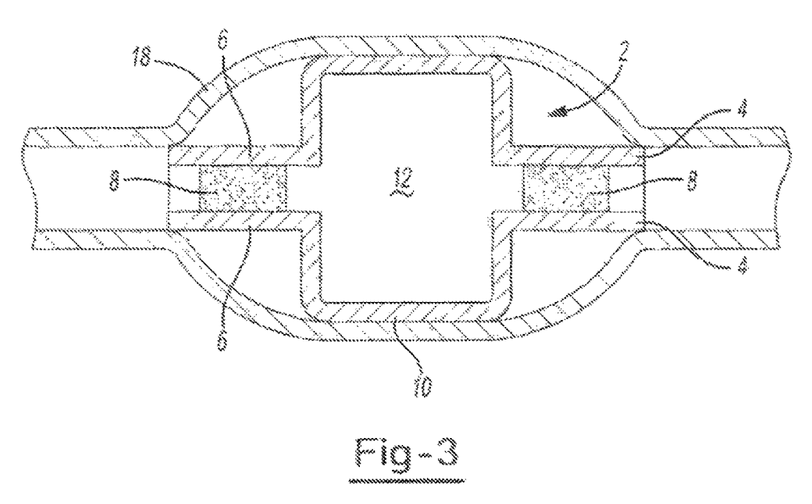
FIG. 3 illustrates a cross-section view of the insert illustrated in FIG. 1.

FIG. 3 illustrates a cross-sectional view of the embodiment illustrated in FIG. 1 in a cured state. The insert 2 is located in a cavity 18. The carriers 4 each include an opposing attachment portion 6 and a non-attachment portion 10. An attachment device 8 is located between the opposing attachment portions 6. The attachment device 8 is in the expanded state so that the non-attachment portion is forced against an inside well of the cavity 18 as the two opposing attachment portions are moved so that the insert 2 is held in place. The view shows a channel 12 formed between the two carriers 4.

Figure 4:
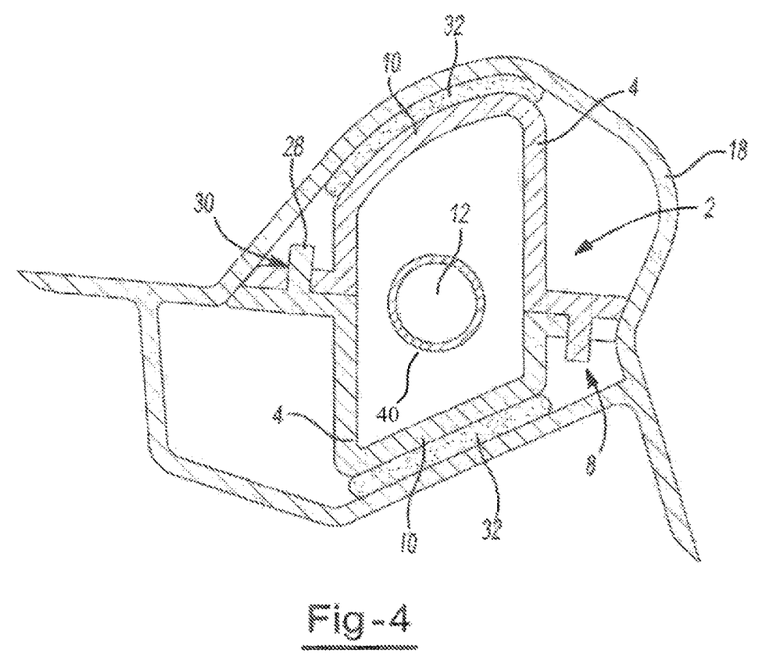
FIG. 4 illustrates a cross-sectional view of another insert.

FIG. 4 illustrates a cross-sectional view of one embodiment of the present teachings. The insert 2 is comprised of a pair of opposing carriers 4. The opposing carriers include a non-attachment portion 10 and an attachment portion 6 on opposite sides of the non-attachment portion 10. The attachment portions 6 each include an attachment device 8. The attachment device 8 includes a male portion 28 and a female portion 30, which fixedly attach the carriers 4 together forming an insert 2. The insert 2 includes a reinforcing material 32 on the outside of the insert 2 reinforcing and connecting the insert 2 to the cavity 18. As illustrated the insert includes a cap 40 that attaches to the carrier 4, and the cap includes a circular shaped channel 12 formed in the cap 40 that allows entry into the channel 12 of the insert 2.

Figure 5:
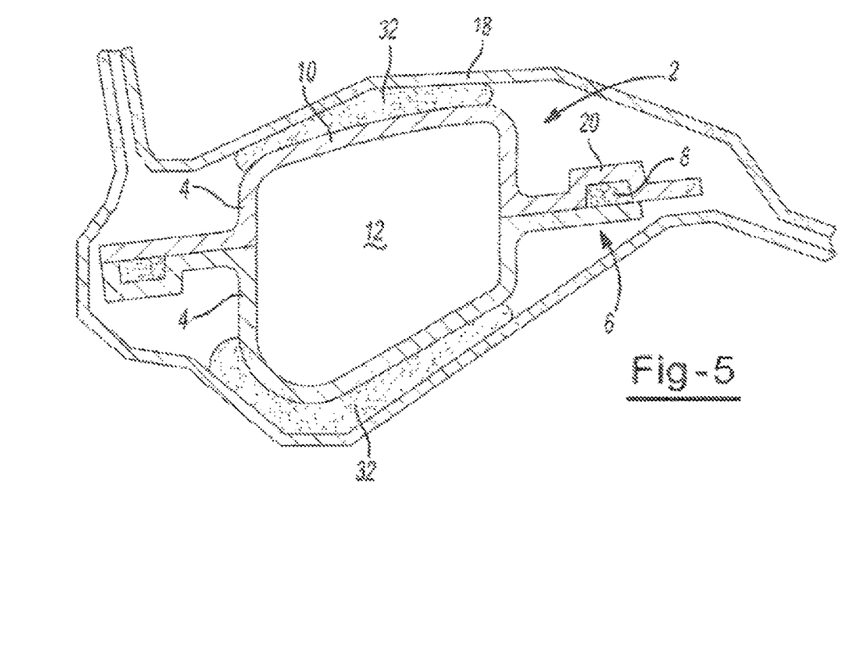
FIG. 5 illustrates a cross-sectional view of one embodiment of present invention.

FIG. 5 illustrates a cross-sectional view of another embodiment of the present teachings. The insert 2 is comprised of two carriers 4; the carriers 4 include an attachment portion 6 and a non-attachment portion 10 that form a channel 12 therebetween. Each carrier 4 includes a recess 20 on opposing sides of the channel 12, and each recess 20 includes an attachment device 8. The insert 2 is reinforced and connected to the cavity 18 with a reinforcing material 32.

Figure 6:
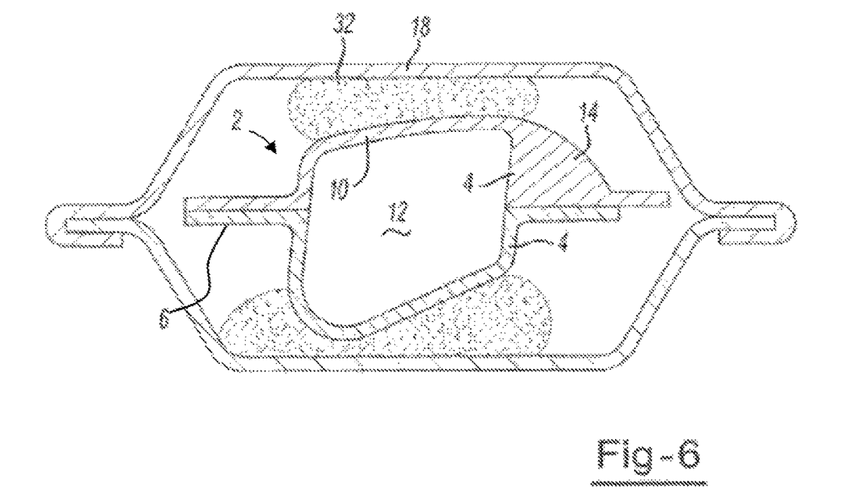
FIG. 6 illustrates a cross ional vie of another embodiment of the present invention.

FIG. 6 illustrates an insert 2 that is made up of two carriers 4 that each include attachment portions 6. The insert includes a channel 12 formed between the two carriers 4. The insert includes reinforcing structures 14 that connect the attachment portion to the non-attachment portion. The insert is attached to the cavity 18 with a reinforcing material 32 located on the outside of the insert 2. The cavity as illustrated is a two part cavity connected at the ends.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in, as similar manner. As can be seen, the teaching of amounts expressed as "parts by weight" herein also contemplates the same ranges expressed in terms of percent by weight. Thus, an, expression in the Detailed Description of the invention of a range in terms of at "'x' parts by weight of the resulting, polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to out 30", inclusive of at least the specified endpoints.

The disclosures of all articles and references, including patent applications and publications, are incorporated by reference for all purposes. The term "consisting essentially of" describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A structure reinforcing insert comprising:
   a. a first carrier portion, the first carrier portion including:
      i. at least one attachment portion;
      ii. a non-attachment portion; and
      iii. a portion of a channel, the channel being surrounded on at least one side by the attachment portion and the non-attachment portion, and extending along all or a portion of the longitudinal axis of the first carrier portion;
   b. a second carrier portion, the second carrier portion including:
      i. at least one attachment portion;
      ii. a non-attachment portion; and
      iii. a portion of a channel, the channel being surrounded on at least one side by the attachment portion and the non-attachment portion, and extending along all or a portion of the longitudinal axis of the second carrier portion;
   wherein the first carrier portion and the second carrier portion are fixedly attached via the respective at least one attachment portions by an activatable reinforcement material, and form a channel between the first carrier portion and the second carrier portion so that components, devices, fluids, or a combination thereof may pass through all or a portion of the insert;
   wherein the first carrier portion and the second carrier portion each include at least one reinforcing structure that includes one or more ribs having a curved edge; the reinforcing structure connects at least one of the at least one attachment portion to the non-attachment portion of each of the first carrier portion and the second carrier portion;
   wherein the activatable reinforcement material located between the attachment portion of the first carrier portion and the attachment portion of the second carrier portion expands upon activation, moving the first carrier portion and the second carrier portion away from each other.

2. A shaped pillar reinforcing body comprising:
   a. at least two carrier portions that are attached together to provide a body that:
      i. provides structural reinforcement by filling a cavity of a hollow support structure and distributing energy from a load;
      ii. provides a surface geometry including one or more ribs having a curved edge that carries an amount of reinforcing material that can be expanded and bonded to surrounding surfaces; and
      iii. provides an obstruction free internal part for routing a component, a device, a fluid, or a combination thereof;

b. an attachment portion on each of the at least two carriers so that shear is resisted along an attachment region between the two portions; and c. an activatable external reinforcing material that is applied to an outer portion of the at least two carriers that is unconstrained from outward expansion between the two portions and an adjacent surface;

wherein the internal part of the at least two carrier portions remains obstruction free after activation of the external activatable reinforcing material; and wherein a funnel is located at one end of the obstruction free internal part which guides components, devices, fluids, or a combination thereof into the obstruction free internal part, wherein the obstruction free internal part and the funnel have a diameter ratio between 1:3 and 1:5.

3. The structure reinforcing insert of claim 1, including a funnel at one end of the channel which guides components, devices, fluids, or a combination thereof into the channel.

4. The structure reinforcing insert of claim 3, wherein the channel includes a tortuous path; and the funnel leads to the tortuous path.

5. The structure reinforcing insert of claim 1, wherein the activatable reinforcement material is dry and tack free to the touch in its green state, cured state, expanded state, or a combination thereof.

6. The structure reinforcing insert of claim 2, wherein the at least one attachment portion of the first carrier portion includes a dowel, and the at least one attachment portion of the second carrier portion includes a receptor for attachment to the dowel.

7. The structure reinforcing insert of claim 1, wherein the channel includes a metal tube molded within the portion of the channel of the first carrier portion and the portion of the channel of the second carrier portion;

wherein components, devices, fluids, or a combination thereof pass through the metal tube to pass through the hollow support structure.

8. The structure reinforcing insert of claim 1, wherein the channel extends from a first end of the insert to the second end of the insert so that components, devices, fluids or a combination thereof can pass through the insert.

9. The structure reinforcing insert of claim 1, wherein the first carrier portion and the second carrier portion have one or more substantially continuous surfaces.

10. The structure reinforcing insert of claim 1, wherein the first carrier portion and the second carrier portion include a plurality of the at least one reinforcing structure which are spaced apart and oriented generally transverse; and define a recess between the reinforcing structures and provide for clearance between an external surface of the respective carrier portion and any inwardly extending projections from at least one of a plurality of walls of the hollow support structure.

11. The structure reinforcing insert of claim 10, wherein the plurality of the at least one reinforcing structure are free of the activatable reinforcement material.

12. The structure reinforcing insert of claim 1, wherein the first carrier portion and the second carrier portion are separately manufactured and then assembled together.

13. The structure reinforcing insert of claim 1, wherein the channel is free of a transverse internal wall.

14. The structure reinforcing insert of claim 1, wherein the channel extends about 75 percent or less of a total length of the insert.

15. The structure reinforcing insert of claim 1, wherein the at least one reinforcing structure is a rib that provides load handling.

16. The structure reinforcing insert of claim 1, wherein the reinforcing insert is located within a cavity, and wherein the activatable reinforcement material is free from contacting an inner wall of the cavity and an outer portion of the structure reinforcing insert.

17. A method for attaching the structure reinforcing insert of claim 1 within a cavity comprising:

i) locating the structure reinforcing insert within a cavity such that at least 70 percent of an outer surface of the structure reinforcing insert is disposed within 1.0 mm to 5.0 mm of an inner wall of the cavity; and ii) activating the activatable reinforcement material such that the non-attachment portion of the first carrier portion and the second carrier portion are forced against an inside wall of the cavity as the two opposing attachment portions are moved so that the reinforcing insert is held in place.

18. The structure reinforcing insert of claim 2, wherein the at least one attachment portions of the first carrier portion and the second carrier portion include a mechanical interlock, so that the first carrier portion and the second carrier portion are fixedly attached to each other.

19. The shaped pillar reinforcing body comprising of claim 2, wherein the shaped pillar reinforcing body includes a cap that attaches to the at least two carriers, the cap including a circular shaped channel formed in the cap that allows entry into the obstruction free internal part.

* * * * *